United States Patent
O'Connell, Jr.

(10) Patent No.: US 9,792,262 B2
(45) Date of Patent: *Oct. 17, 2017

(54) CLIENT-SIDE WEB SERVICE PROVIDER

(71) Applicant: Open Text SA ULC, Halifax (CA)

(72) Inventor: Conleth S. O'Connell, Jr., Austin, TX (US)

(73) Assignee: Open Text SA ULC, Halifax (CA)

( * ) Notice: Subject to any disclaimer, the term of this patent is extended or adjusted under 35 U.S.C. 154(b) by 300 days.

This patent is subject to a terminal disclaimer.

(21) Appl. No.: 14/614,739

(22) Filed: Feb. 5, 2015

(65) Prior Publication Data
US 2015/0154150 A1    Jun. 4, 2015

Related U.S. Application Data

(63) Continuation of application No. 13/618,837, filed on Sep. 14, 2012, now Pat. No. 8,966,509, which is a continuation of application No. 12/858,054, filed on Aug. 17, 2010, now Pat. No. 8,312,480, which is a
(Continued)

(51) Int. Cl.
| | |
|---|---|
| G06F 9/44 | (2006.01) |
| G06F 15/16 | (2006.01) |
| G06F 17/21 | (2006.01) |
| G06F 17/30 | (2006.01) |
| H04L 29/08 | (2006.01) |

(52) U.S. Cl.
CPC ........ G06F 17/212 (2013.01); G06F 17/3089 (2013.01); G06F 17/30861 (2013.01); G06F 17/30905 (2013.01); H04L 67/02 (2013.01)

(58) Field of Classification Search
None
See application file for complete search history.

(56) References Cited

U.S. PATENT DOCUMENTS

| | | |
|---|---|---|
| 4,754,428 A | 6/1988 | Schultz et al. |
| 4,811,207 A | 3/1989 | Hikita et al. |
| 5,202,982 A | 4/1993 | Gramlich et al. |
| (Continued) | | |

FOREIGN PATENT DOCUMENTS

WO    WO 00/39666 A1    7/2000

OTHER PUBLICATIONS

Dasgupta, Partha, "Resource Location in Very Large Networks," IEEE First Int'l Workshop on Services in Distributed and Networked Environments, May 1994, pp. 156-163.
(Continued)

*Primary Examiner* — Van Nguyen
(74) *Attorney, Agent, or Firm* — Sprinkle IP Law Group

(57) ABSTRACT

To facilitate client access to web services, a server may be configured to package or bundle a function call for a web service with associated information. The resulting function call package may be distributed to multiple clients. Such a package may include parameters for the function call and/or software code that can facilitate a client web site to make the function call. The package may also include branding information associated with the web service. Results of the function call can be presented through the client web site with the branding information associated with the web service, allowing a third party to retain branding for their web service provided through the client web site.

20 Claims, 5 Drawing Sheets

Related U.S. Application Data continuation of application No. 10/915,858, filed on Aug. 11, 2004, now Pat. No. 7,788,681.

(60) Provisional application No. 60/503,523, filed on Sep. 16, 2003.

(56) References Cited

U.S. PATENT DOCUMENTS

| | | | |
|---|---|---|---|
| 5,210,824 A | 5/1993 | Putz et al. | |
| 5,212,787 A | 5/1993 | Baker et al. | |
| 5,226,161 A | 7/1993 | Khoyi et al. | |
| 5,257,369 A | 10/1993 | Skeen et al. | |
| 5,293,619 A | 3/1994 | Dean | |
| 5,331,673 A | 7/1994 | Elko et al. | |
| 5,339,392 A | 8/1994 | Risberg et al. | |
| 5,421,015 A | 5/1995 | Khoyi et al. | |
| 5,473,772 A | 12/1995 | Halliwell et al. | |
| 5,504,879 A | 4/1996 | Eisenberg et al. | |
| 5,572,643 A | 11/1996 | Judson | |
| 5,619,709 A | 4/1997 | Caid et al. | |
| 5,704,017 A | 12/1997 | Heckerman et al. | |
| 5,727,129 A | 3/1998 | Barrett et al. | |
| 5,732,218 A | 3/1998 | Bland et al. | |
| 5,740,430 A | 4/1998 | Rosenberg et al. | |
| 5,761,416 A | 6/1998 | Mandal et al. | |
| 5,774,660 A | 6/1998 | Brendel et al. | |
| 5,774,888 A | 6/1998 | Light | |
| 5,790,426 A | 8/1998 | Robinson | |
| 5,790,790 A | 8/1998 | Smith et al. | |
| 5,796,952 A | 8/1998 | Davis et al. | |
| 5,829,022 A | 10/1998 | Watanabe et al. | |
| 5,870,559 A | 2/1999 | Leshem et al. | |
| 5,878,223 A | 3/1999 | Becker et al. | |
| 5,884,282 A | 3/1999 | Robinson | |
| 5,918,014 A | 6/1999 | Robinson | |
| 5,958,008 A | 9/1999 | Pogrebisky et al. | |
| 6,012,052 A | 1/2000 | Altschuler et al. | |
| 6,026,413 A | 2/2000 | Challenger et al. | |
| 6,041,311 A | 3/2000 | Chislenko et al. | |
| 6,049,777 A | 4/2000 | Sheena et al. | |
| 6,067,565 A | 5/2000 | Horvitz | |
| 6,085,226 A | 7/2000 | Horvitz | |
| 6,088,702 A | 7/2000 | Plantz et al. | |
| 6,092,049 A | 7/2000 | Chislenko et al. | |
| 6,094,662 A | 7/2000 | Hawes | |
| 6,112,279 A | 8/2000 | Wang | |
| 6,128,655 A | 10/2000 | Fields et al. | |
| 6,138,141 A | 10/2000 | DeSimone et al. | |
| 6,141,737 A | 10/2000 | Krantz et al. | |
| 6,151,624 A | 11/2000 | Teare et al. | |
| 6,185,586 B1 | 2/2001 | Judson | |
| 6,185,608 B1 | 2/2001 | Hon et al. | |
| 6,192,415 B1 | 2/2001 | Haverstock et al. | |
| 6,198,824 B1 | 3/2001 | Shambroom | |
| 6,272,492 B1 | 8/2001 | Kay | |
| 6,336,137 B1 | 1/2002 | Lee et al. | |
| 6,408,360 B1 | 6/2002 | Chamberlain et al. | |
| 6,430,624 B1 | 8/2002 | Jamtgaard et al. | |
| 6,434,543 B1 | 8/2002 | Goldberg et al. | |
| 6,571,246 B1 | 5/2003 | Anderson et al. | |
| 6,651,217 B1 | 11/2003 | Kennedy et al. | |
| 6,687,793 B1 | 2/2004 | Thomas et al. | |
| 6,697,844 B1 | 2/2004 | Chan et al. | |
| 6,701,345 B1 | 3/2004 | Carley et al. | |
| 6,701,428 B1 | 3/2004 | Harvey, III et al. | |
| 6,741,853 B1 | 5/2004 | Jiang et al. | |
| 6,754,621 B1 | 6/2004 | Cunningham et al. | |
| 6,792,605 B1* | 9/2004 | Roberts | H04L 29/06 709/202 |
| 6,850,941 B1 | 2/2005 | White et al. | |
| 6,865,593 B1* | 3/2005 | Reshef | G06F 17/3061 379/221.09 |
| 7,000,238 B2 | 2/2006 | Nadler et al. | |
| 7,194,733 B2 | 3/2007 | Ringseth et al. | |
| 7,493,397 B1* | 2/2009 | Guthrie | H04L 67/40 709/202 |
| 7,506,059 B2 | 3/2009 | Mulligan | |
| 7,640,348 B2 | 12/2009 | Atwal et al. | |
| 7,698,398 B1 | 4/2010 | Lai | |
| 7,769,825 B2 | 8/2010 | Karakashian et al. | |
| 7,788,681 B1 | 8/2010 | O'Connell | |
| 7,797,450 B2 | 9/2010 | Xie et al. | |
| 8,312,480 B2 | 11/2012 | O'Connell | |
| 8,966,509 B2 | 2/2015 | O'Connell | |
| 2001/0032254 A1 | 10/2001 | Hawkins | |
| 2001/0034771 A1 | 10/2001 | Hutsch et al. | |
| 2002/0065912 A1 | 5/2002 | Catchpole et al. | |
| 2002/0107835 A1 | 8/2002 | Coram et al. | |
| 2002/0165877 A1 | 11/2002 | Malcolm et al. | |
| 2002/0178187 A1 | 11/2002 | Rasmussen et al. | |
| 2003/0061404 A1 | 3/2003 | Atwal et al. | |
| 2003/0101223 A1 | 5/2003 | Pace et al. | |
| 2003/0105884 A1 | 6/2003 | Upton | |
| 2003/0204645 A1 | 10/2003 | Sharma et al. | |
| 2003/0217117 A1 | 11/2003 | Dan et al. | |
| 2003/0233631 A1 | 12/2003 | Curry et al. | |
| 2004/0015564 A1 | 1/2004 | Williams | |
| 2004/0015578 A1 | 1/2004 | Karakashian et al. | |
| 2004/0030697 A1 | 2/2004 | Cochran et al. | |
| 2004/0044656 A1 | 3/2004 | Cheenath | |
| 2004/0045004 A1 | 3/2004 | Cheenath | |
| 2004/0054690 A1 | 3/2004 | Hillerbrand et al. | |
| 2004/0177335 A1 | 9/2004 | Beisiegel et al. | |
| 2004/0205452 A1 | 10/2004 | Fitzsimmons et al. | |
| 2004/0220952 A1 | 11/2004 | Cheenath | |
| 2004/0236758 A1 | 11/2004 | Medicke et al. | |
| 2005/0044197 A1 | 2/2005 | Lai | |
| 2013/0013674 A1 | 1/2013 | O'Connell | |

OTHER PUBLICATIONS

"DataSage Customer Analyst," 1999, 2 pgs., DataSage, Inc., Reading, MA.

"DataSage Customer Analyst", 1998, 11 pgs., DataSage, Inc., Reading, MA.

Kitts, Brendan, "An Evaluation of Customer Retention and Revenue Forecasting in the Retail Sector: Investigation into the Effects of Seasonality, Spending and Method" by DataSage, Inc., Reading, MA, Oct. 25, 1999, 63 pgs.

Kitts, Brendan, "RMS Revenue and Retention Forecasting Final Phase Model Specification," Jan. 31, 2000, 16 pgs. by DataSage, Inc., Reading, MA.

Miller, M., "Applications Integration—Getting It Together," PC Magazine, Feb. 8, 1994, pp. 111-112, 116-120, 136, 138.

Montgomery, Alan L., et al., "Estimating Price Elasticities with Theory-Based Priors," Journal of Marketing Research, vol. 36, Nov. 1999, pp. 413-423.

Obraczka, Katia, et al., "Internet Resource Discovery Services," University of So. California, IEEE Computer Magazine, Sep. 1993, pp. 8-22.

Rapoza, Jim, "PointCast 2.0 Eases Burden on Network, improvements in interface, performance make it a solid upgrade" PCWeek, Jun. 2, 1997, vol. 14, n.22, pp. 1-2.

Amato-Mccoy, Deena M., "New Customer Management System Returns Lost Sales to Dick's," RT Magazine, Jun. 1999, 1 pg.

Sharma, P.K., et al., "Hypertext Based Distributed Object Management for Information Location and Retrieval," Engineering Mgmt Conf., 1993, IEEE, pps. 102-107.

Simon, Hermann, "Price Management," 1989, pp. 13-41, Elsevier Science Publishers, Mainz, West Germany.

Strom, David, "The Best of Push," Web Review, Apr. 1997, 6 pgs.

Subrahmanyan and Shoemaker, "Developing Optimal Pricing and Inventory Policies for Retailers Who Face Uncertain Demand," Journal of Retailing, vol. 72, No. 1, pp. 7-30.

Thirdvoice.com, Home Page and Frequently Asked Question, retrieved Dec. 28, 2000, from <www.thirdvoice.com and www.thirdvoice.com/help.20/faq.htm>, 7 pgs.

Turley, Patrick, "Design Specification for Packaged Application Support in Assassin," 1999, Vignette Corp., Austin, TX, 6 pgs.

(56) References Cited

OTHER PUBLICATIONS

Turley, Patrick, "Functional Specification for Packaged Application Support in Assassin," 1999, Vignette Corp., Austin, TX, 6 pgs.

Vetter, Ronald, et al., "Mosaic and the World-Wide Web," IEEE Computer—Computer, 1994, vol. 27, No. 10, pp. 49-57.

Vilcassim, Naufel J. and Chintagunta, "Investigating Retailer Product Category Pricing from Household Scanner Panel Data," Journal of Retailing, vol. 71, No. 2, 1995, pp. 103-128.

Weinstein, Steve, "Tackling Technology," Progressive Grocer, Feb. 1999, 6 pgs.

Wellman, David, "Down in the (Data) Mines," Supermarket Business, May 1999, pp. 33-35.

Aragon, Lawrence, "When Shove Comes to Push (vendors offering Internet push technologies for content delivery)," PC Week, vol. 14, No. 6, Feb. 10, 1997, 5 pgs.

"Encryption and Decryption", Microsoft, 2001, retrieved May 23, 2001 from <wysiwyg://101/http://msdn.microsoft . . . brary/wcedoc/wcesecur/crypto_1.htm>, 2 pgs.

Office Action for U.S. Appl. No. 10/915,858, mailed Sep. 24, 2007, 19 pgs.

Office Action for U.S. Appl. No. 10/915,858, mailed Nov. 12, 2008, 17 pgs.

Office Action for U.S. Appl. No. 10/915,858, mailed Apr. 29, 2009, 8 pgs.

Office Action for U.S. Appl. No. 10/915,858, mailed Jan. 20, 2010, 8 pgs.

Office Action for U.S. Appl. No. 12/858,054, mailed Dec. 15, 2011, 13 pgs.

Office Action for U.S. Appl. No. 13/618,837, mailed Aug. 29, 2014, 9 pgs.

Notice of Allowance for U.S. Appl. No. 13/618,837, mailed Oct. 14, 2014, 5 pgs.

\* cited by examiner

CLIENT-SIDE WEB SERVICE PROVIDER

CROSS-REFERENCE TO RELATED APPLICATION(S)

This is a continuation, and claims a benefit of priority under 35 U.S.C. §120, of U.S. patent application Ser. No. 13/618,837, filed Sep. 14, 2012, now U.S. Pat. No. 8,966,509, entitled "CLIENT-SIDE WEB SERVICE PROVIDER," which is a continuation of U.S. patent application Ser. No. 12/858,054, filed Aug. 17, 2010, now U.S. Pat. No. 8,312,480, entitled "CLIENT-SIDE WEB SERVICE PROVIDER," which is a continuation of U.S. patent application Ser. No. 10/915,858, filed Aug. 11, 2004, now U.S. Pat. No. 7,788,681, entitled "CLIENT-SIDE WEB SERVICE PROVIDER," which claims priority from Provisional Application No. 60/503,523, filed Sep. 16, 2003, entitled "CLIENT-SIDE WEB SERVICE PROVIDER," all of which are fully incorporated by reference herein.

TECHNICAL FIELD

This disclosure relates generally to web services. More particularly, this disclosure relates to third party web branding through client-side web services.

BACKGROUND

Many different businesses maintain a presence on the Internet. Typically, this presence is in the form of a web site, although a business may also use the Internet to access information or services, or to provide information or services. Often, a business may combine a number of these uses. For example, a business may provide a web site that provides information about the business and allows users of the web site to access services that are provided by a server that is separate from the business' web site.

Conventionally, services that reside at sites other than the business' web site have been accessed by providing a link to the other site. Thus, a user might view a first web site, see a link to a service, click on the link, and be taken to the site at which the service resides. Originally, it was typical for this type of linking to be readily apparent, as the user was simply transferred to the second web site. This could be somewhat problematic, however, as it is generally desirable for the business to keep the user at its own web site in order to maximize the effect of the web site (e.g., to increase the exposure of the business or the sales made via the web site). Techniques have therefore been developed to disguise the transfer of the user to the second web site. For instance, when a user is transferred to the second web site from the first web site, the appearance of the second web site may be altered by using graphics provided by the first web site or other indicia of the first web site. It may therefore appear that the services are actually being provided by the first web site.

Another technique for providing services over the internet is referred to as "web services." While the services described above are provided over the web (the internet), the term "web services" is typically used (and will be used herein) to refer to services that can be accessed by making a function call to a remote server and then providing the results returned by the function call to the user of the first web site. "Web services" are further described in the Web Services Interoperability Organization's Basic Profile Version 1.0, herein incorporated by reference. While this technique keeps the user at the first web site and may simplify or streamline the process of providing the requested services to the user, there are several problems associated with the use of web services that still exist.

One problem is that, while a function call for accessing the web service may be defined and available for use by potential clients, the proper syntax for the function call may not be apparent. For example, it may be clear that the function call should include a date, but the required format of the date in the function call may not be clear. Thus, a client may make the function call with the date in the format "Jan. 1, 2002", when the date should instead be in the format "01/01/02". The function call may therefore fail because the web service provider cannot interpret the date.

Another problem is that the web service provider may wish to have the web service presented in a particular way. For instance, the web service provider may be a provider of traveler's checks and may wish to have trademarks associated with the traveler's checks presented to the user in connection with the means for accessing the web service for ordering traveler's checks from the provider because a particular web service is typically accessed by looking up the form of a function call corresponding to the web service and making the function call without any regard to the branding of the service. The web services provided through the function call may therefore be presented to an end user in a way that is inconsistent with the presentation desired by the provider of the web service.

SUMMARY

One or more of the problems outlined above may be solved by the various embodiments of the invention. Broadly speaking, the invention comprises systems and methods for enabling clients to access web services, wherein function calls are packaged with information and/or code that facilitates use of the function calls.

One embodiment comprises a system that includes a server, where the server is configured to provide a web service accessible through a function call. The server is configured to bundle the function call for the web service with information for facilitating use of the web service. The resulting function call package is provided to clients so that they can access the web service. The information for facilitating use of the web service may further include information for facilitating execution of the function call which may, for example, include parameters for the call or software code. The software code can be configured to format user input for use as parameters of the function call, to prompt the user for parameters, to control the display of the results received in response to execution of the function call, or to otherwise facilitate use of the function call and the corresponding web services.

Another embodiment comprises a method that includes the steps of providing a function call for accessing a web service, bundling the function call with information for facilitating use of the web service, or execution of the function call, in a function call package, and distributing the function call package.

Another embodiment comprises a software program product. The software program product contains program instructions that are configured to cause a computer to perform the method comprising the steps of providing a function call for accessing a web service, bundling the function call with information for facilitating use of the web service or execution of the function call in a function call package, and providing the function call package to a client.

In one embodiment, a function call is packaged with information corresponding to one or more of the input parameters, output parameters, or return values defined for the function call. The information may provide the actual parameters for the function call, or they may provide information to a client that enables the client to produce a syntactically correct function call for the web service. In one embodiment, the package includes code, which may be in various languages such as Java or Perl that is configured to perform some process in support of the function call. These processes may include such things as interacting with a user to obtain parameters for the function call, formatting parameter values, making the function call, formatting the results of the call, and so on. The processes may also involve some degree of management control, such as controlling the display of the web service results to include the logos of the service provider, use certain colors, fonts, etc. in the displayed results, and so on. The code may also allow a client to customize the package, within the constraints of the service provider's controls, to fit within its own display scheme. The client may also be allowed to modify the package and to distribute the modified package to its own affiliates.

Numerous additional embodiments are also possible.

The various embodiments of the invention may provide a number of advantages over the prior art. These advantages may include, for example: overcoming syntactical problems that would otherwise be encountered by a client that is aware of the substantive content of a function call parameter, but is unaware of the particular formatting that is necessary within the framework of the function call; enabling a service provider to implement management controls to ensure proper use of logos, colors, and the like; and enabling a client to modify the package to implement its own controls within the constraints of the service provider's controls and to distribute the modified package to its affiliates to allow them to access the web service in the same manner. Still other advantages will be apparent to those of skill in the art.

BRIEF DESCRIPTION OF THE DRAWINGS

Other objects and advantages of the invention may become apparent upon reading the following detailed description and upon reference to the accompanying drawings.

Figure 1:
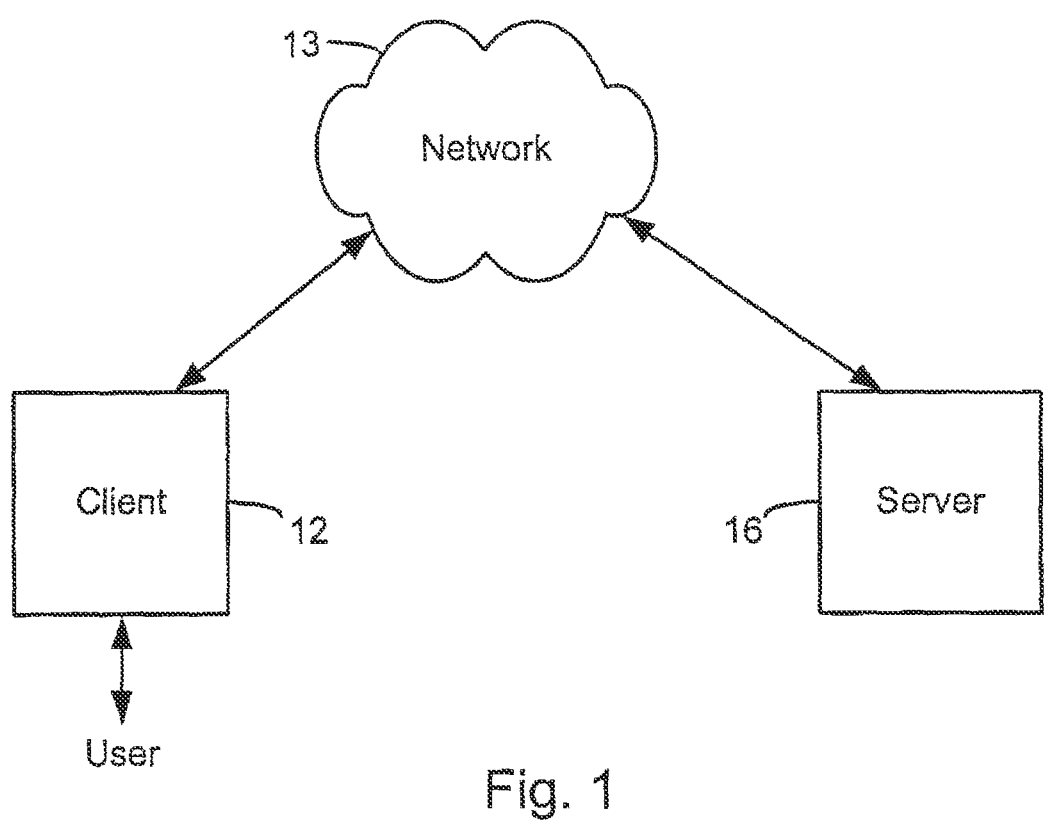
FIG. 1 is a diagram illustrating some of the basic components of a network system.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the disclosure.

DETAILED DESCRIPTION

One or more embodiments of the invention are described below. It should be noted that these and any other embodiments described below are exemplary and are intended to be illustrative of the invention rather than limiting.

As described herein, various embodiments of the invention comprise systems and methods for enabling access to web services wherein function calls are packaged with information and/or code that facilitates use of the function calls.

One embodiment comprises a method for providing access to web services. In this embodiment, a web service provider makes a web service available and defines a function call that can be used to request the service (to call the web service function). The web service provider then takes the function call and packages it in a manner that facilitates its use. For example, one or more of the fields of the function call may be provided, or code may be bundled with the function call to revise improperly formatted fields in the function call before the call is executed.

Another embodiment comprises a system configured to package a function call with information corresponding to one or more of the input parameters, output parameters, or return values defined for the function call. The function call may further be packaged with code in a suitable programming language configured to perform processes in support of the function call. The information packaged with the function call may provide the actual parameters for the function call, or they may provide information that enables production of a syntactically correct function call for the web service. The code packaged with the function call may facilitate preparation or execution of the function call, or may implement management control over the display or other use of the web services.

The various embodiments are typically implemented in a network environment. The network consists of multiple devices (e.g., workstations, servers, etc.) that may be arranged in any of a variety of topologies. A preferred embodiment of the invention is implemented in an internet environment.

Referring to FIG. 1, a diagram illustrating some of the basic components of a network system is shown. As depicted in this figure, the system comprises a client 12, a network 13, and a server 16. It should be noted that the network configuration illustrated in FIG. 1 is intended to be exemplary rather than limiting. Other embodiments may employ alternative configurations. For example, there may be multiple clients and multiple servers that are interconnected by multiple individual networks. Alternatively, a client may be directly coupled to a server without an intervening network. Many such variations are possible.

Communications between client 12, and server 16 (as well as network 13) can be accomplished using electronic, optical, radio-frequency, or other signals. For example, client 12 may convert signals received from server 16 to a human understandable form and may convert input from a human understandable form to appropriate electronic, optical, radio-frequency, or other signals to be used by server 16. Similarly, when an operator is at server 16, server 16 may convert the signals to a human understandable form when sending a communication to the operator and may convert input from a human understandable form to appropriate electronic, optical, radio-frequency, or other signals to be used by client 12.

Figure 2:
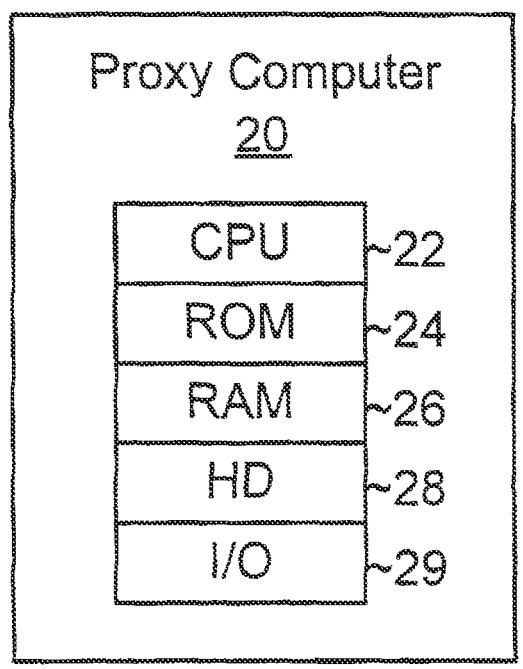
FIG. 2 is a diagram illustrating the components of an exemplary computer system.

In one embodiment, each of client 12 and server 16 is implemented in a corresponding computer system. These computer systems may comprise desktop computers, laptop computers, or other types of devices capable of communicating over the networks and processing the information communicated between them. Referring to FIG. 2, a diagram illustrating the components of an exemplary computer system is shown. The computer system illustrated in this figure may be used as a platform for client 12 or server 16.

As shown in FIG. 2, computer system 20 comprises a central processing unit ("CPU") 22, read-only memory ("ROM") 24, random access memory ("RAM") 26, hard disk drive ("HD") or storage memory 28, and input/output device(s) ("I/O") 29. I/O 29 can include a keyboard, monitor, printer, electronic pointing device (e.g., mouse, trackball, stylus, etc.), or the like.

The computer systems that provide platforms for the client and server may each have more than one CPU, ROM, RAM, HD, I/O, or other hardware components. For simplicity, the computer illustrated in FIG. 2 is depicted in as having one of each of the listed hardware components. It should be noted that FIG. 2 is a simplification of an exemplary hardware configuration. Many other alternative hardware configurations are possible and known to persons of skill in the art.

It should be noted that, in addition to being implemented in suitable computer systems, some embodiments may be implemented in software programs or code. The software code comprises instructions configured to cause a computer on which the code is executed to perform a method in accordance with the present disclosure. These software embodiments may be referred to as software program products. The software code may be embodied in any suitable computer-readable media. For instance, the software code may reside within ROM 24, RAM 26, hard disk drives 28 or other computer-readable media within a computer system. The software code may also be contained on a separable data storage device, such as a removable hard disk, or on removable computer-readable media such as a DASD array, magnetic tape, floppy diskette, optical storage device, or the like. In one embodiment, the software code may comprise lines of compiled C++, Java, or other language code.

"Computer" and "computer system," as used herein, are intended to include any type of data processing system capable of performing the functions described herein. "Computer-readable media," as used herein, refers to any medium that can store program instructions that can be executed by a computer, and includes floppy disks, hard disk drives, CD-ROMs, DVD-ROMs, RAM, ROM, DASD arrays, magnetic tapes, floppy diskettes, optical storage devices and the like.

Figure 3:
FIG. 3 is a diagram illustrating the use of a link to transfer a user from a first web site to a second web site that provides desired services.

As mentioned above, businesses may wish to maintain web sites that provide a variety of services, some of which are not resident on the business' web site. These businesses may make use of remote web sites that provide the desired services. An example is illustrated in FIG. 3. Referring to FIG. 3, a web site 100 is hosted by a business operating under the name OnlineBank.com. OnlineBank.com wishes to provide its users with a convenient way to order traveler's checks. OnlineBank.com does not provide this service locally, so it provides a link 105 to a second web site 110, which is hosted by another business as TravelersChecks.com. TravelersChecks.com has a server that delivers a function through which traveler's checks can be ordered by users. After the users order traveler's checks through this web site, however, they are left at the TravelersChecks.com site instead of being transferred back to the original (OnlineBank.com) web site.

This is the traditional way in which remote services were provided. The user was actually transferred to the remote web site by clicking on the link to the services. The display that is presented to the user could be branded for OnlineBank.com, but the user was actually at the TravelersChecks.com web site. The user then had to fill out forms or otherwise transact with the remote web site as if he or she had originally gone directly to the remote site in order to obtain the desired services (e.g., ordering traveler's checks).

This type of interaction could be used to provide other services in the same manner. For example, a business might have an affiliate program. An affiliated web site (an affiliate) can present a button to a user that says, e.g., "buy this book." The affiliate in this example corresponds to the local (i.e., OnlineBank.com). When the user clicks on the button, the user is taken to the service provider's web site. The server at the service provider's web site keeps track of where the order came from (i.e., the affiliate web site), and a commission is paid to the affiliate.

The problem with the interactions described above is that the user was removed from the context of the original web site. After the user accessed the services that were desired, the user was left at the remote web site instead of the original web site. The business operating the original web site had thus lost the user that it had originally attracted to its web site, and consequently lost the interaction, advertising potential, etc. for which the business had originally tried to attract the user to the site.

As noted above, another technique that is available for accessing remotely provided services is the web services mechanism. Web services are also sometimes referred to as application services. The term "web services" describes a standardized way of integrating Web-based applications using open standards such as XML (Extensible Markup Language), SOAP (Simple Object Access Protocol), WSDL (Web Services Description Language) and UDDI (Universal Description, Discovery and Integration), typically over an IP-protocol network such as the internet. Usually, XML is used to tag the data, SOAP is used to transfer the data, WSDL is used for describing the services available and a UDDI server is used to provide a list of the web services that are available. Web services may be used as a means for businesses to communicate with each other and with clients, or for allowing organizations to communicate data to each other without having intimate knowledge of each other's IT systems.

Unlike traditional client/server models such as a web server/web page system, web services do not provide the user with a GUI and do not require the use of browsers or HTML. Web services instead share business logic, data and processes through a programmatic interface across a network. Software applications themselves interface with each other so that users do not have to. Developers can add web services to GUIs, often through web pages or executable programs, to offer specific functionality or services to users.

Web services allow different applications from different sources to communicate with each other without time-consuming custom coding, and because all communication is in a standardized language such as XML, Web services are not tied to any one operating system or programming language. Thus, a Java application can communicate with a Perl script, a Windows application can communicate with a UNIX application, and so on.

Using the web services mechanism, a client can generate a request to a server which provides the desired service in response to the request. While there are a variety of mechanisms for remote procedure calls that are in some respects similar, web services are somewhat unique in that they do not require that the server distribute a library of information describing the web service in order to enable its use. Other mechanisms may need information regarding the procedure for determining the existence of the server-side function, the format of the procedure call (the number and types of input and out parameters, as well as return values), the manner of invoking the procedure, and the manner of receiving a response from the server. In fact, it is typically necessary, when using mechanisms other than web services, to compile such information into the client-side software. Web services do not involve programming languages, per se, at all. The discovery and invocation process is executed using XML descriptions of the data (procedure signature and parameter definitions) over commonly used transport protocols, such as HTTP.

Figure 4:
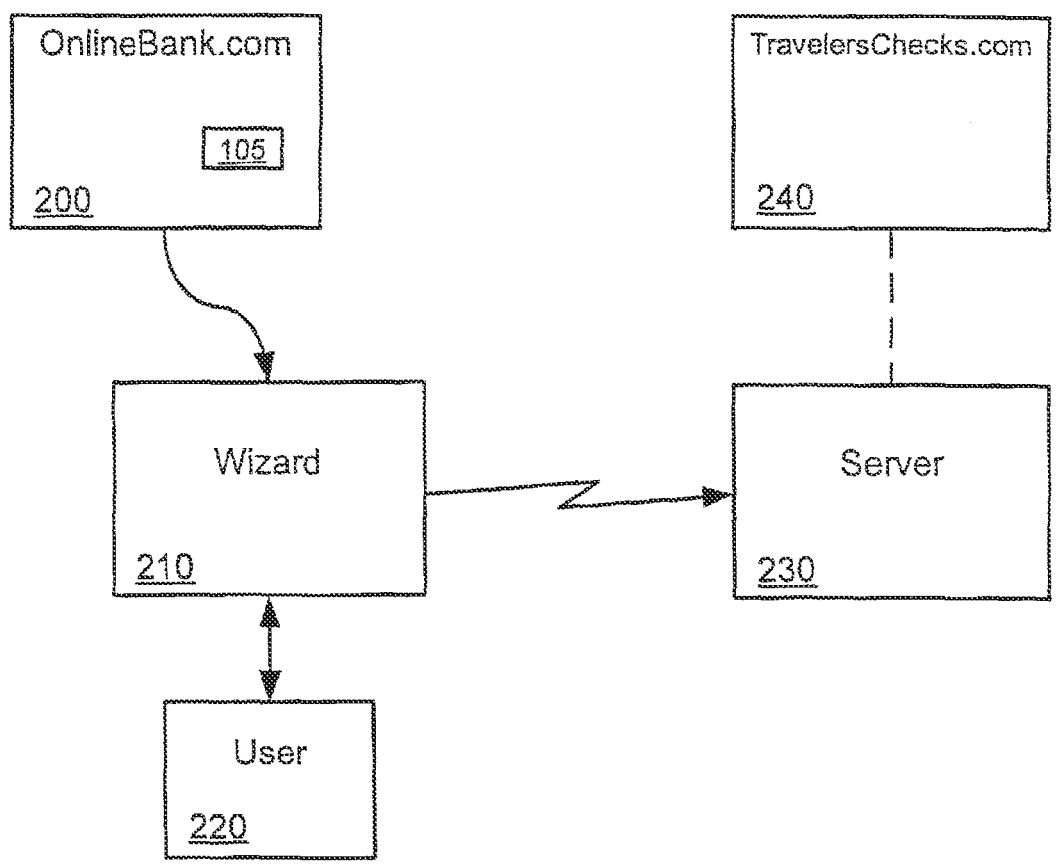
FIG. 4 is a diagram illustrating the use of a function call package at a first web site to obtain a desired service from a second web site without the user having to leave the first web site.

Referring to FIG. 4, the use of web services to provide users with access to services residing on remote sites is illustrated. Web services allow the user to stay within the context of the original web site 200 (OnlineBank.com), but still access the remotely provided service by transitioning the user into a wizard 210 or similar process within the original web site. (Although shown separately in the figure, wizard 210 is a process operating within the context of web site 200.) Wizard 210 interacts with the user 220 and collects the necessary information for the desired transaction, then submits a transaction to a transaction system 230 associated with the remote web site 240 which provides the service. Transaction system 230 processes the transaction (e.g., creates the order for the traveler's checks) and typically responds to wizard 210 on original web site 200 with a confirmation. The confirmation then provides the basis for a display that is presented to user 220. It should be noted that the transaction is directed to transaction system 230, and not to web site 240 itself. Thus, while the transaction may appear in many respects to the user to be the same as the previous methods, the user never actually leaves the original web site.

Transaction system 230 may be a server. The purpose of the server is to provide a function or service, such as ordering travelers checks. There are a set of parameters that server needs to have in order to process an order for travelers checks. These parameters may include such information as the user's address, quantity of traveler's checks desired, denominations, partner credentials (to make sure that the order is coming from a partner authorized to use the system), and so on. This information may take the form of strings, integers, binary values, logical values or various other types of data. This information is used to make a function call to the server to access the function or service. In the context of web services, this function call is expressed in a way that anyone who can use web services has this function call available to them, so that they can make the function call to the server and place an order for traveler's checks.

The function call is formatted in a way that it can be used by essentially anyone. Typically, the function call is defined or formatted in web services description language, or WSDL. WSDL is used to define the parameters of the function call so that it can be made available to potential users of the service. The function call in WSDL usually has input parameters, output parameters and a return value. Each of these parameters is defined by a name and a type.

Prior to the advent of web services, the function call parameters would all be expressed in binary representations, and header files, and the like. Anybody that wanted to use the function call had to compile code that was provided by the service provider into their software in order to be able to make the function calls for the desired services. In a web services environment, it is not necessary for a potential user of the web services to obtain any code to compile into their own software. Instead, these potential users only have to have an explanation of how the function call is made. The function call can then be made in XML, possibly using SOAP.

The location of the function call for a web service can be determined by accessing a UDDI server. UDDI is a directory service. The UDDI server identifies web services that are available, who provides them, and the manner in which function calls for these Web services are made. For example, there are public UDDI servers. It is possible to browse into these servers and find different services. For instance, the UDDI server might identify a service for temperature conversion. According to the information in the UDDI server, the function call might require that a number, a type (e.g., Fahrenheit) for the temperature prior to conversion, and a type for the temperature after conversion (e.g., Celsius) be provided in a function call. In response to this function call, the server that provides the web service would return a number that represents the converted temperature. The function calls and responses are typically just XML calls that could actually be formatted by hand and sent back and forth.

A great deal of attention has been paid to the tools and definitions of the server-side components involved in web services, i.e., how to publish the server-side functions, how to make the web services available to be discovered and to be invoked, and how to support the incoming XML SOAP request and transform it into the native server-side programming environment where the execution of the service occurs. What has not been addressed, however, is a model to allow the service provider to create a client-side package that invokes the SOAP request.

This is important because, while the web services model gives a user the means to access web services, the user still has to figure out exactly how to implement these means (i.e., how to make the function calls). In a normal web services call, the client has to create the code to make the call, has to understand the semantics of the call's parameters (what does "address" mean", how is it formatted, etc.). All of this is outside the scope of the information stored in the UDDI server. Thus, while the user may know that it is necessary to provide a value such as a date as one of the parameters of the function call, the particular format of the date in the function call may be unknown. Then, the client receives only "barebones" information returned by the server in response to the call. There is no formatting, control, or the like. Because the web services model focuses on the simple transfer of information back and forth through XML calls, there is no mechanism for the service provider to control the manner in which the services are presented to an end user. There is therefore no means to ensure, for example, that appropriate branding is used with the services.

These issues result in many of the interoperability problems that are conventionally experienced when using web services. Simply formatting an expression in XML doesn't solve these problems—it is still necessary to know what has to be accomplished and how it has to be done.

The result of these issues is that incorporating a web service in a site presents a whole host of problems. For example, suppose web site 200 (OnlineBank.com) wishes to integrate the web service provided by second web site 240 (TravelersChecks.com) in a manner in which the web services of TravelersChecks.com may be provided without having to leave the original OnlineBank.com site. In this case, the OnlineBank.com site will have to obtain a list of web services available from TravelersChecks.com, determine the web service it wishes to incorporate, determine what information is required by that web service, and construct an interface to obtain the required information from user 220 of the web site 200 (possibly using wizard 210). Once information is obtained from user 220, the site 200 (possibly using wizard 210) can construct a call to the web service (or transaction system 230) and return the results to user 220 of original web site 200. This is problematic, if the web service changes so must the interface for obtaining information from user 220, and the associated call to the web service, essentially breaking the original web site 200 (or wizard 210). Additionally, as the web service interface is presented by the OnlineBank.com site, the actual provider of the web service, TravelersChecks.com, has no way to control how its web service, or the results, are presented.

The embodiments disclosed herein address the client side of the web services model by essentially allowing the client-side experience to be presented as the provider of the web service wants it to be expressed. This may include parameterization as appropriate to allow the experience to fit within the environment of the user of the web services, or a web site which incorporates the web service. This tool gives the web service provider control over the client-side expression of the web service and thus provides an ability to, for example, protect the brand associated with the service.

Figure 5:
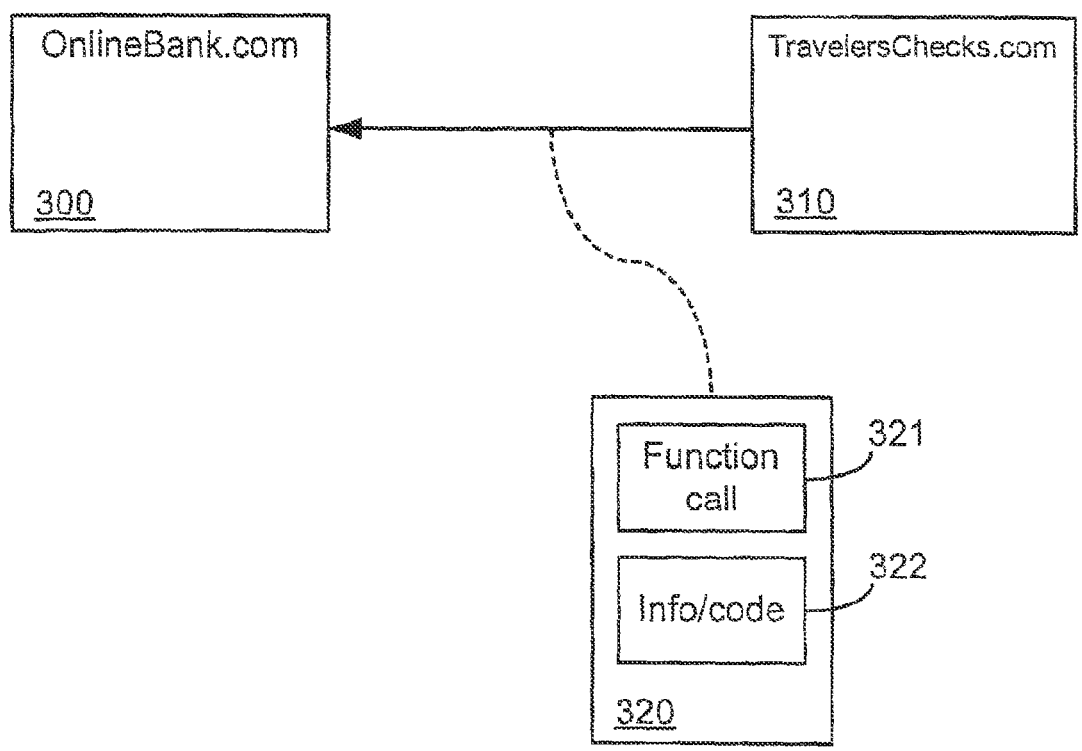
FIG. 5 is a diagram illustrating an embodiment of the invention in which a service provider provides a packaged function call for use in obtaining web services.

Referring to FIG. 5, one embodiment of the invention comprises providing a package 320 from a web service provider 310 to a web site which wishes to incorporate a web service, where package 320 contains a function call 321 corresponding to a particular web service, as well as some additional information or code 322 that can reduce the site's effort in attempting to make the function call to obtain the web service. Package 320 may therefore include one or more of the input, output or return parameters. Package 320 may also include code (e.g., in Java) that performs various functions, such as assisting the incorporating web site 200 in providing the appropriate function call parameters, actually making the function call to the service provider's transaction system, presenting the results of the function call to a user at a client, and so on.

By providing the incorporating web site 300 with function call 321 that is packaged in this manner, this embodiment of the invention gives the service provider some control over how the web service is being provided. The package provided to the site 300 provides enough information for the site 300 to be able to make a function call to web service provider 310 without having to struggle with the semantics, and also allows the service provider to retain branding associated with the service, as well as some degree of management control.

Thus, in the OnlineBank.com example used above, TravelersCheck.com would provide a packaged function call to OnlineBank.com. The package might contain some of the required input/output parameters, or might provide information to OnlineBank.com in order to enable the OnlineBank.com site to properly format the input/output parameters. This package can be comprised of text files in the form of HTML, XML or JavaScript that are deployed by the client to expose the Web Service in their environment. In addition, the packaged may be composed of an archive file (such as ear, tar, jar, war) containing compiled code from Java, C#, C++, etc. or a combination thereof including documentation. A properties file or style sheet or configuration file could be a way for the client organization to modify the behavior of the package to make any user interface or other components of the package fit into their application. Using this information, the OnlineBank.com site may obtain appropriate information from a user who whishes to utilize the web service.

Based on this information, OnlineBank.com may then make a function call to the web service provided by TravelersChecks.com. The package might also include Java code to make the call. The call itself and the result of the call (the service) would still be communicated between OnlineBank.com and TravelersChecks.com in the form of SOAP. Once OnlineBank.com receives these results from TravelersChecks.com they may be formatted according to information 322 in package 320, thus the results would be displayed to the OnlineBank.com user in a manner that conforms to the requirements of TravelersChecks.com. For instance, the results could be displayed with a TravelersChecks.com icon and/or using a trademark associated with traveler's checks provided by TravelersChecks.com. All of this functionality provided by the packaged function call could, for example, be wrapped up in a wizard of the type illustrated in FIG. 4.

It should be noted that the control of the function call and/or its results provided by the embodiment of the invention described above may nevertheless allow an incorporating web site to customize the package to fit within the site's own scheme. The site may therefore be able to modify the package (within the constraints of the service provider's controls) and distribute the modified package to its own affiliates, so that they can use the same package to obtain the corresponding service.

When a user wants to use the Web service, the package is activated. This may be accomplished by making a call to the Java code within the package, which then initiates the function call to obtain the web service. The information included in the package can control how to make the call, how to handle the confirmation, how to display the results of the web service to the user (e.g., how logos are displayed and what colors are used), and so on.

Those of ordinary skill in the art will understand that these methodologies for incorporating web services may be applied at any level. For example, packages for web services may be distributed directly to a user, or may be re-distributed by an incorporating web site to other web sites which wish to incorporate the original web service.

Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. The information and signals may be communicated between components of the disclosed systems using any suitable transport media, including wires, metallic traces, vias, optical fibers, and the like.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with processors, digital signal processors (DSPs) or other logic devices, application specific integrated circuits (ASICs), field programmable gate arrays (FPGAs), discrete gates or transistor logic, discrete hardware components, or any combination thereof designed to perform the functions described herein. A processor may be any suitable processor, controller, microcontroller, state machine or the like. A processor may also be implemented as a combination of computing devices, e.g., a combination of a DSP and a microprocessor, a plurality of microprocessors, one or more microprocessors in conjunction with a DSP core, or any other such configuration.

The steps of the methods or algorithms described in connection with the embodiments disclosed herein may be embodied directly in hardware, in software or firmware modules executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the disclosure is not intended to be limited to the embodiments shown herein but is to be accorded the widest scope consistent with the principles and novel features disclosed herein.

The benefits and advantages which may be provided by the invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system, comprising:
   at least one processor;
   non-transitory computer memory; and
   stored instructions embodied on the non-transitory computer memory and translatable by the at least one processor to perform:
   responsive to a client device associated with a user requesting a web service at a web site, activating a package from a web service provider computer by making a call to code contained in the package, wherein responsive to the call, the code initiates a function call to the web service provider computer to obtain the web service from the web service provider computer, wherein the package includes information for properly formatting one or more input/output parameters and return values required by the function call; and
   presenting results of the function call through the web site on the client device.

2. The system of claim 1, wherein the stored instructions are further translatable by the at least one processor to perform modification of the package from the web service provider.

3. The system of claim 2, wherein the package includes a properties file, a style sheet, or a configuration file for the modification of the package.

4. The system of claim 2, wherein the stored instructions are further translatable by the at least one processor to perform distribution of the modified package to at least one affiliate computer so that the at least one affiliate computer is able to obtain the web service from the web service provider computer using the modified package.

5. The system of claim 1, wherein the stored instructions are further translatable by the at least one processor to perform distribution of the package to at least one affiliate computer so that the at least one affiliate computer is able to obtain the web service from the web service provider computer using the package.

6. The system of claim 1, wherein the information comprises branding information associated with the web service and wherein the results of the function call are presented with the branding information associated with the web service, thereby retaining branding associated with the web service provided through the web site.

7. The system of claim 1, wherein the package includes text files for exposing the web service to users of the web site.

8. A method, comprising:
   a web site server computer receiving a package from a web service provider computer, wherein the package includes code for making a function call corresponding to a web service and information for properly formatting one or more input/output parameters and return values required by the function call;
   responsive to a client device associated with a user requesting the web service at a web site, the web site server computer activating the package from the web service provider computer by making a call to the code contained in the package, wherein responsive to the call, the code initiates the function call to the web service provider computer to obtain the web service from the web service provider computer;

the web site server computer receiving results of the function call from the web service provider computer; and the web site server computer presenting results of the function call through the web site on the client device.

9. The method according to claim 8, further comprising:
the web site server computer modifying the package from the web service provider.

10. The method according to claim 9, wherein the package includes a properties file, a style sheet, or a configuration file for modification of the package.

11. The method according to claim 9, further comprising:
the web site server computer distributing the modified package to at least one affiliate computer communicatively connected thereto so that the at least one affiliate computer is able to obtain the web service from the web service provider computer using the modified package.

12. The method according to claim 8, further comprising:
the web site server computer distributing the package to at least one affiliate computer communicatively connected thereto so that the at least one affiliate computer is able to obtain the web service from the web service provider computer using the package.

13. The method according to claim 8, wherein the information comprises branding information associated with the web service and wherein the results of the function call are presented with the branding information associated with the web service, thereby retaining branding associated with the web service provided through the web site.

14. The method according to claim 8, wherein the package includes text files for exposing the web service to users of the web site.

15. A computer program product comprising at least one non-transitory computer readable medium storing instructions translatable by at least one processor to perform:

receiving a package from a web service provider computer, wherein the package includes code for making a function call corresponding to a web service and information for properly formatting one or more input/output parameters and return values required by the function call;

responsive to a client device associated with a user requesting the web service at a web site, activating the package from the web service provider computer by making a call to the code contained in the package, wherein responsive to the call, the code initiates the function call to the web service provider computer to obtain the web service from the web service provider computer;

receiving results of the function call from the web service provider computer; and presenting results of the function call through the web site on the client device.

16. The computer program product of claim 15, wherein the instructions are further translatable by the at least one processor to perform modification of the package from the web service provider.

17. The computer program product of claim 16, wherein the package includes a properties file, a style sheet, or a configuration file for the modification of the package.

18. The computer program product of claim 16, wherein the instructions are further translatable by the at least one processor to perform distribution of the modified package to at least one affiliate computer so that the at least one affiliate computer is able to obtain the web service from the web service provider computer using the modified package.

19. The computer program product of claim 15, wherein the instructions are further translatable by the at least one processor to perform distribution of the package to at least one affiliate computer so that the at least one affiliate computer is able to obtain the web service from the web service provider computer using the package.

20. The computer program product of claim 15, wherein the information comprises branding information associated with the web service and wherein the results of the function call are presented with the branding information associated with the web service, thereby retaining branding associated with the web service provided through the web site.

* * * * *